INVENTOR.
THEODORE F. ARONSON
FLOYD A. LYON
BY

Sept. 27, 1960 T. F. ARONSON ET AL 2,953,967
PROJECTOR WITH REMOVABLE SLIDE BOX
Filed Jan. 31, 1958 3 Sheets-Sheet 3

*INVENTOR.*
THEODORE F. ARONSON
BY FLOYD A. LYON

ATTORNEY.

United States Patent Office 2,953,967
Patented Sept. 27, 1960

2,953,967

PROJECTOR WITH REMOVABLE SLIDE BOX

Theodore F. Aronson, Glen Cove, and Floyd A. Lyon, Brookville, N.Y., assignors to Viewlex, Inc., Long Island City, N.Y.

Filed Jan. 31, 1958, Ser. No. 712,356

3 Claims. (Cl. 88—28)

This invention relates to slide projector or viewer means and more particularly to such means having a removable slide box magazine.

Modern slide projectors generally have a slide magazine of the type which is relatively long and which is open on top. The slides are placed in spaced slots in the magazine, and the magazine is indexed each time a slide is viewed. These magazines generally accommodate thirty slides. One of the disadvantages with these magazines is that they are not too suitable for storage since the top is open and exposed to dirt and dust. Also, the majority of slide sequences or groups average ten or twelve slides and the larger size magazine is not too convenient.

There has also appeared in the prior art smaller box type magazines accommodating ten or twelve slides which are substantially enclosed by the box, the box having slots to permit removal and insertion of the slides. Some of these box type magazines have elaborate mechanisms for taking a slide out of a stationary box, then transporting it to the back of the box, then replacing it in the box. This type mechanism is quite complicated and has a great tendency to jam the slides. Another type mechanism is one wherein the box is reciprocated with respect to the projector. This type is shown by the French Patent No. 667,104.

The primary problem of moving slides in and out of the box type magazine is that the slides are not separated by dividers in the magazine, but slide on top of one another. Since the slides are composed of a relatively thick rim portion surrounding the slide, when the slides are pushed back and forth to and from a stack, there is a great possibility of interference between the edges of the slides, that is, both the outside and inside edges of the rim portions. Heretofore, for this reason, the box type devices have not been practical due to the jamming of the slides. This difficulty is further complicated by the fact that as the slides are handled, they tend to bend along a center axis and also to become dog-eared, worn, and bent at the corners which magnifies the possibility of their mutual interference.

The present invention solves this difficulty by providing means for tilting the stack of slides in the box at predetermined times during the cycle of operation so that a slide being pushed in or out along the stack travels at an angle with respect to the stack, and the possibilities of interference between the edges of the slides are eliminated. The present invention tilts the stack by means of a novel spring arrangement which cooperates with camming means in a projector to tilt the stack at proper points in the cycle as the box is pushed in and out of the projector.

Accordingly, a principal object of the invention is to provide new and improved slide projector or viewer means.

Another object of the invention is to provide new and improved slide projector or viewer means of the type having a box slide magazine.

Another object of the invention is to provide new and improved slide projector or viewer means of the type having a box slide magazine which is adapted to reciprocate in and out of the projector.

Another object of the invention is to provide new and improved box slide magazine means having means to prevent interference between the slides.

Another object of the invention is to provide new and improved box slide magazine means having means to prevent interference between the slides comprising means to tilt the slide stack within the box.

Another object of the invention is to provide new and improved slide box magazine means.

These and other objects of the invention will be apparent from the following specification and drawings, of which:

Figure 1 is a plan view partially cut away showing an embodiment of the invention.

Figures 2, 3, and 4 are views similar to Figure 1 illustrating the use of the invention.

Figures 5, 6, and 7 are detail views of the embodiment of Figure 1.

Figure 1:
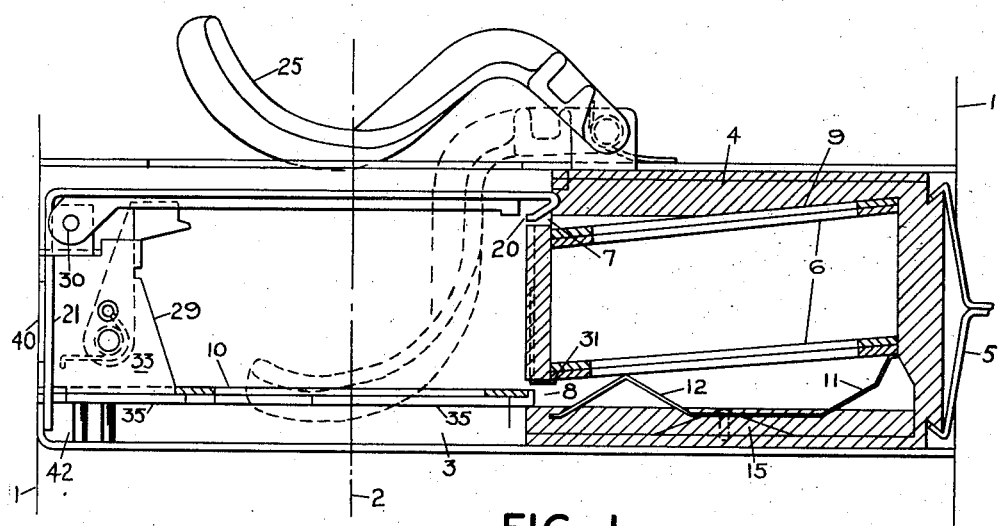

Referring to Figure 1, the invention comprises generally a projector 1 having an optical axis 2 and having a track 3 adapted to accommodate a slide box magazine 4, the box being adapted to be pushed in and out of the projector along the track 3 by means of the removable handle 5. The box contains a stack of slides 6 and has slots 7 and 8 for the removal and insertion of slides as the box is moved in and out of the projector. A hook member 20 is pivotally mounted in the projector on the shaft 30 and has a right angle extension 21 which is used for releasing the hook through finger aperture 40 when removing the last slide from the projector, as will be more fully explained. The box is preferably fully enclosed except for slots 7 and 8.

Means are provided for tilting the stack 6 comprising generally springs 11 and 12 which cooperate with a cam plate 35 in the projector. These are best explained in connection with the operation of the device.

With the box all the way out, Figure 1, and the slide 10 in viewing position, the stack 6 is shown tilted due to the action of the spring 11 mounted on a pedestal 15 in the back of the box 4. The side of the box has a slanting recess portion 9 to accommodate the tilting of the stack. The stack 6 is tilted by springs 11 and 12 and held by clip 31 on the box wall.

Figure 2:
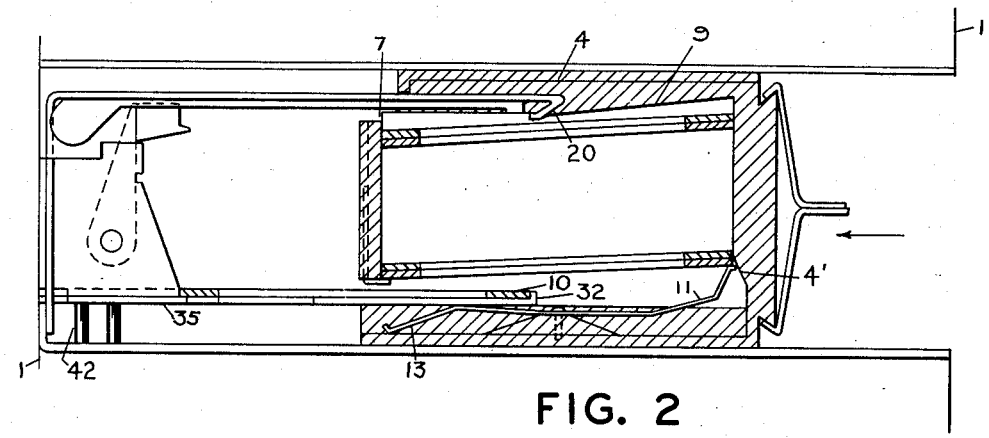

As the box is pushed in, Figure 2, the hook 20 enters the box and presses back on one end of the stack and tends to level it off. The hook 20 has some degree of freedom but is spring loaded down and constrained by the upper surface of slot 7 of the box sufficiently to tend to level the stack as shown in Figure 2. The slide 10, which has been viewed, is shown entering the box but still resting on cam plate 35 positioned by the viewing positioning member 32. The spring 12 has been cammed back by the portion 13 of the viewing enclosure cam plate 35, Figure 7. There can be no interference between the slide 10 and the stack. The slides are loose enough to level off by gravity.

Figure 3:
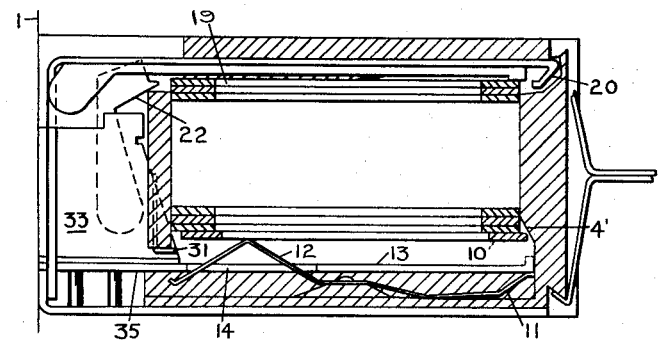
Figure 7:
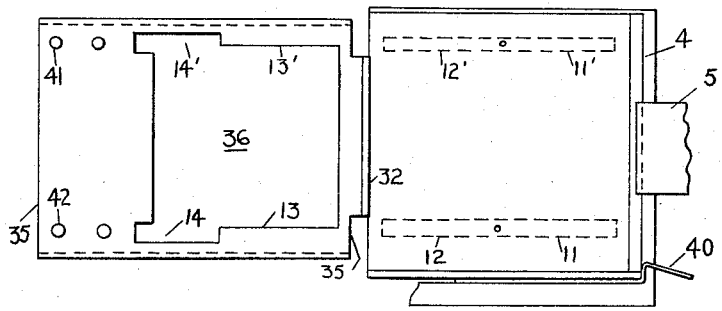

Figure 3 shows the box all the way in and the stack substantially level, being also pushed forward by the action of the spring 12 which is now in the cutout portion 14, Figure 7, of the viewing enclosure cam plate 35. The slide 10 is not quite fully even with the other slides in the box, but it has been pushed forward by the spring 12 past the projection 31. When the box is again pulled out, the slide 10 will slide onto the projection 31 due to the action of spring 11 and slanted portion 4' of the box and will be even with the remainder of the stack. The front slide 19 is in the plane of hook 20. Box 4 is notched to accommodate the full travel of hook 20.

Figure 4:
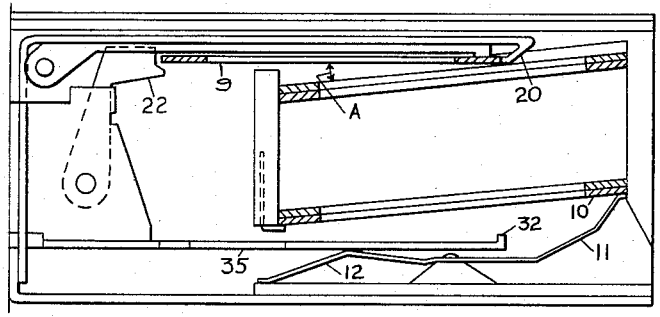

Figure 4 shows the box being pulled out. Spring 11 has been released, and spring 12 has been cammed back by cam plate 35, Figure 7. The top slide 19 has been engaged by the hook 20, and the pawl 22 has rotated under the extending edge of the slide 19. In Figure 3 the pawl 22 was rotated out of the way of the box. The stack has been tilted again by the action of the spring 11 so that there is an angle A between the top slide in the stack and the slide 19 being removed. Therefore, there is a clearance between the edges of these two slides which might normally interfere if the stack was not tilted.

As the box is completely removed, the left-hand side of the slide 19 is still retained by the pawl 22; and as the box leaves contact with the other end of the slide 19, that end starts to fall and at the same time the spring loaded rotating curved pusher 25, Figure 1, pushes the slide 19 into the viewing position. There are two curved pusher members, one at each edge of the slide outside the hook members 20, 20'. If the extending edge of the slide 19 was not momentarily held by the pawl 22, there would be a possibility of the curved pusher 25 jamming the slide 19. The slide is guided into proper viewing position by the slanted guide 29, portion of projector bracket 33.

There is no possibility of the slide 10 interfering with the lower slide in the stack if the slide 10 slides straight in and does not contact the slides in the stack until it is pushed straight up. Therefore, there is no sliding contact between the slide 10 and the stack.

When all the slides have been viewed, the last slide may be placed in the box without picking up a new slide by raising the hook 20. This is done by pressing the hook levers 21, 21', Figure 5, as the box is pushed in and pulled out. The box is removed from the projector by pressing locking clip 40, Figure 7.

Figure 6:
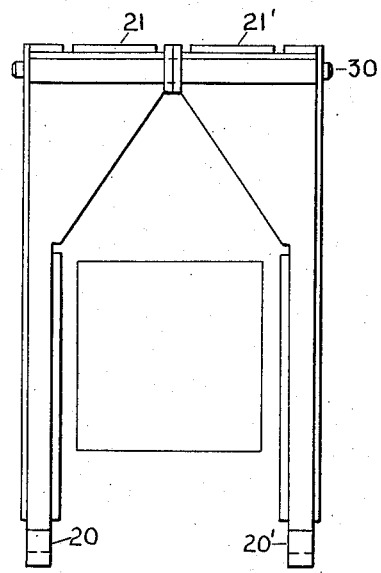

The curved pusher member 25, Figure 1, has an L-shaped cross section, the lip thereof fitting along the bottom edge of the slide. There are two curved pusher members, one adapted to contact each edge of the slide outside hook members 20, 20' with an opening in between along the optical axis. There are also two hook members 20 and 20', as shown in Figure 6, and two sets of springs 11, 11' and 12, 12', as shown in Figure 7.

Figure 5:
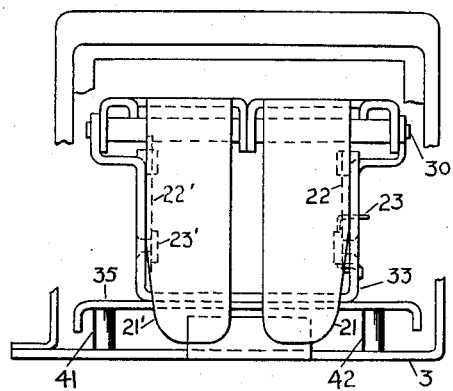

Figure 5 is a detail end view of Figure 1 showing the mounting of the hook members on the shaft 30 and the mounting of the pawl members 22, 22' and their springs 23, 23', which are mounted on a U bracket 33 supporting shaft 30. Bracket 33 in turn is mounted on cam plate 35 which is mounted on the projector track 3 by means of posts 41, 42. The turned-down edges of the cam plate 35 are for added strength. The hook members 20, 20' have right angle finger levers 21 and 21', the purpose of which is to release the hook 20 when removing the last slide from the projector. There is an access hole 40, Figure 1, in the projector to permit the operator's fingers to press the levers 21 and 21'.

Figure 7 shows a detail view, reduced in size, showing the operation of cam plate 35 which contains a viewing aperture 36 and cutout portions 14 and 14'. The portions 13 and 13' of the cam plate 35 act to cam the spring members 11, 11' and 12, 12'. In other words, when the springs are behind the portions 13 and 13', they are cammed away; and when they are within the cutouts 14 and 14', they extend through to provide the proper tilting action of the stack. A locking spring 40 is also provided to prevent the box from being unintentionally removed from the projector.

Figure 8:
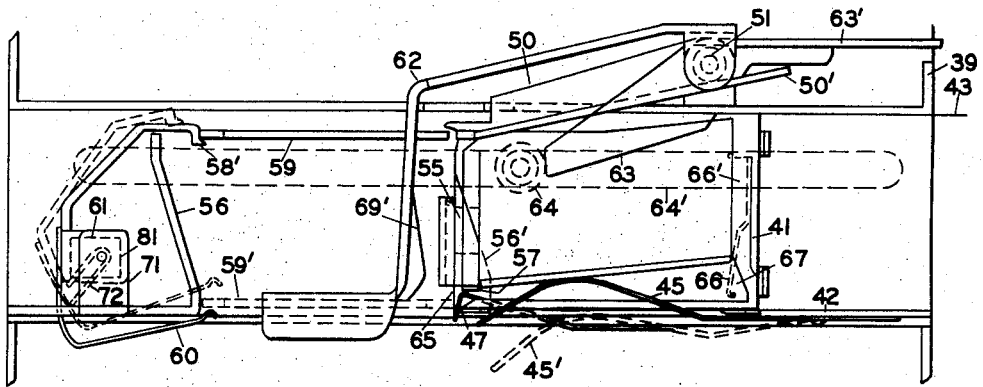
Figure 8 is a plan view of another embodiment of the invention.
Figure 9:
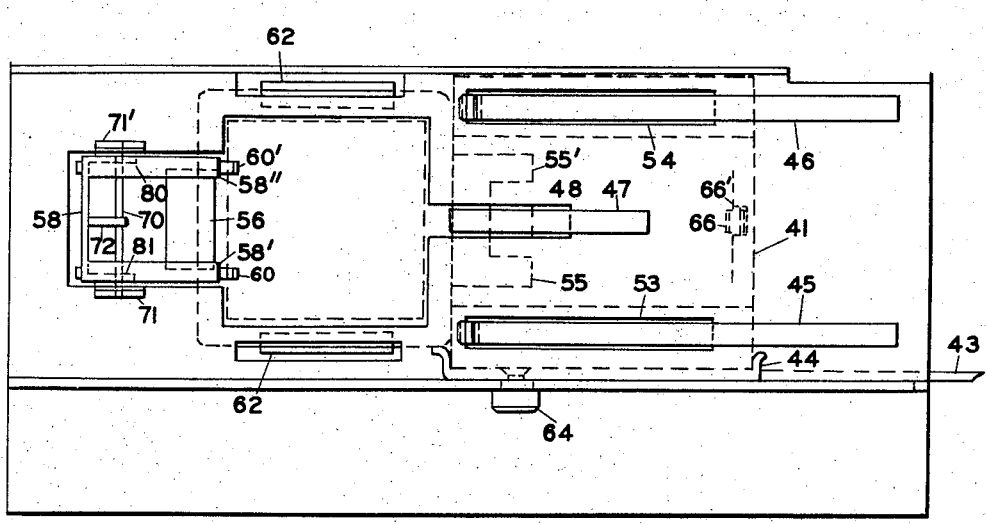
Figure 9 is an elevation view of the embodiment of Figure 8.
Figure 10:
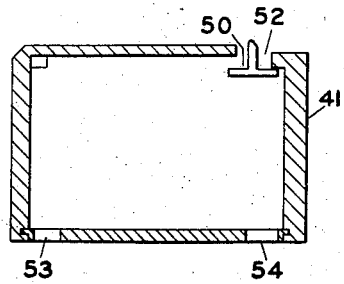
Figure 10 is a detail view of the box of Figures 8 and 9.

Figures 8, 9, and 10 show another embodiment of the invention wherein the springs are removed from the box and mounted on the track of the projector. The box is slotted to permit entry of the springs. The box is also slotted on the other side, and the slides are removed by means of a pawl which enters the slot.

Referring now specifically to Figures 8, 9, and 10, the box 41 is mounted on the track 42 of the main frame 39 and is moved by means of the handle 43 which is clipped to the box by means of the spring clip 44. Springs 45 and 46 are mounted on the outside of the track 42 and enter the box through longitudinal slots in the track and box. In Figure 8 the box is shown in the "fully out" position. The dotted line 45' shows the position of the spring 45 when the box is pushed in. Spring 46 corresponding to spring 45 is located on the other side of the box as shown in Figure 9. A third spring 47 is also mounted on the outside of the track and enters the box through a slot 48 in the center of the box and a corresponding slot in track 42. The purpose of spring 47 is to keep the slides from bouncing into the box through slot 65 when the pusher arm 62 moves them to viewing position.

For removing the slides from the box a pawl 50 is rotatably mounted on shaft 51 which is connected to the main frame. The pawl 50 is adapted to enter the box through a slot 52, Figure 10. Figure 10 also shows slots 53 and 54 which accommodate the springs 45 and 46. There are corresponding slots to accommodate the springs 45, 46, and 47 in the track itself.

Bracket 56 is solidly mounted on the main frame. Bracket 58 is pivotally mounted by ears 80, 81 onto shaft 70 which is mounted on brackets 71, 71' connected to the main frame. Bracket 58 has two extending arms terminating in tips 58', 58". Springs 60, 60' are mounted on bracket 58.

When the box is in the "in" position, the bracket 58 is rotated counterclockwise by the box to the dotted position, and the springs 60, 60' lift the slide which has just entered the box up higher than the clip 57. As the box is pulled out, the spring 66 in the box then moves that bottom slide in on top of the clip 57. As the box is withdrawn, the bracket 58 returns clockwise to the full line position of Figure 8, under the influence of the spring 72, and the tips 58', 58" rotate to the position shown in Figure 8 under the edge of the slide which has just been removed from the box, which holds the slide 59 momentarily as the box is withdrawn to prevent jamming.

The forward end of the box has notches 55, 55' to accommodate the springs 60, 60' when the box is in the "in" position. The bracket 56 enters the box to the extent indicated by the dotted lines 56' for the purpose of pushing the slide past the holding clip 57 in the box.

The rotatable pusher member 62 is pivotally mounted on the shaft 51 and operates in the same manner as previously described in connection with the other figures. However, it is provided with a camming surface 69 to facilitate its being pushed out of the way by the box. There is a corresponding pusher 62' adapted to contact the opposite side of the slide. A rotatable stop 63 having a handle 63' is rotatably mounted on shaft 51 and adapted to contact the stud 64 mounted on the handle 43 to prevent the box from being inadvertently pulled out of the main frame. When it is desired to remove the box, the handle 63' is depressed thereby allowing the box to be completely withdrawn. When the handle 63' is depressed, the pawl 50 is also raised by tab 50' contacting handle 63' and does not enter the box so that the box may be withdrawn with the full number of slides. The stud 64 rides in a slot 64' in the track of the main frame.

The operation is essentially the same as previously described, namely, that the stack is tilted each time the box is drawn in and out. In the position shown in Figure 8 the box is in the "out" position, and the pawl 50 has just removed from the box the slide 59 which is then moved by means of the spring loaded pusher member 62 to the viewing position shown by the dotted lines 59'.

As a slide is being removed, the stack is being tilted by springs 45 and 46 simultaneously to eliminate interference between the trailing rim of the slide being removed and the forward rim of the next slide remaining in the box.

After the slide has been viewed, as the box is again pushed in, the slide 59, in the position 59', will enter the slot 65 of the box and its trailing edge will be pushed into the box to the extent indicated by the dotted line 56' because of the entry of the bracket 56 into the notch 55 of the box. At the same time as the box is pushed in, the pawl 50 rides between the top of the stack and the inside surface of the box tending to level the stack. As the box is moved in, the spring 47 is cammed away by the box. When the box is pulled out, the springs 45, 46 enter the box and tilt the stack. Spring 66, which is the only spring mounted in the box in this embodiment, tends to hold the end slide on the clip 57, and the stack in tilted position.

Notch 67 in the box permits entry of the slide past holding clip 57. The tilting action of the stack is the same as previously described. In the position shown in Figure 8, the stack has been tilted by means of the springs 45 and 46 rising as the box was withdrawn and at the same time a slide was removed by the pawl 50, the trailing rim of the slide being removed being at an angle to the leading rim of the end slide in the tilted stack so as to eliminate interference between the parallel rim edges of the slides.

Therefore, the present invention provides a projector having a removable box magazine and having means to tilt the stack of slides within the magazine at proper times in the cycle as the box is pushed in and pulled out of the projector. The tilting feature is most important since it has not been practical heretofore to slide the slides on and off a level stack without interference or without having mechanical separators between the slides.

Various modifications will occur to those desiring to practice the invention without departing from the scope thereof which is set forth in the following claims. The invention has been illustrated in connection with a projector but may be used wherever a stack of flat objects are desired to be transferred to and from a box magazine to a working position.

We claim:

1. In a slide projector having an optical axis, a track in said projector perpendicular to said axis to accommodate a sliding magazine box, a magazine box in said track, said box containing a plurality of slides, means in said projector to remove a slide from said box as said box is moved away from said optical axis, curved pusher means rotatably mounted in said projector to move said slide in a direction parallel to said stack to position said slide in viewing position, said box being adapted to pick up said slide on its next inward travel, and means is prevent intereference between said slides, including a spring mounted in said box to tilt said stack and means to control said spring at predetermined points during the travel cycle of said box, comprising cam means connected to said projector, said cam means being adapted and connected to enter said box and contact said spring whereby slides are removed at an angle to said stack.

2. In a slide projector having an optical axis and a track perpendicular to said axis adapted to accommodate a sliding magazine box; a magazine box on said track, said box having first and second slots in one side, the first slot being near the forward wall and the second slot being near the rear of said box, the rear wall of said box having a pedestal adapted to accommodate first and second spring members and the interior front wall of said box being slanted to accommodate tilting of the stack of slides in said box, a hook pivotally mounted in said projector and adapted to extend into said first slot as said box is pushed into said projector, said hook being adapted to engage the first slide in said stack to remove it as said box is retracted, pusher means rotatably mounted in said projector and adapted to move said removed slides from a position adjacent the front of said box to a position adjacent the rear of said box and opposite said second slot, whereby said slide will be reinserted through said second slot into said box when said box is pushed into said projector, and means to tilt the stack of slides when said box is in its outermost position from said projector comprising said first spring member mounted at the rear central portion of said box and adapted to push the outer edge of said slides forward when said box is in its outermost position, and cam means in said projector adapted to cam back said spring as said box is inserted into said projector to thereby remove the tilting force from said stack.

3. In a slide projector having an optical axis, a track perpendicular to said axis in said projector to accommodate a removable sliding magazine box, a magazine box on said track, said box having first and second slots, said box containing a stack of slides, hook means pivotally mounted in said projector to enter a first slot in said box to remove a slide from said box as said box is moved away from said optical axis, pusher means rotatably mounted in said projector to position said removed slide to a viewing position opposite said second slot, said box being adapted to pick up said slide on its next inward travel, and means to prevent interference between said slides, including means to tilt said stack at a predetermined point during the travel cycle of said box, said last means comprising a cam plate being adapted to enter said box to cam said spring means in said box at predetermined points in the cycle, said spring means comprising a first spring member mounted on a pedestal on the rear wall of said box and arranged to force the outer side of said stack forward when said box is in the outer position, said cam plate being arranged to cam said first spring member back as said box is pushed into said projector, the interior forward wall of said box being recessed to accommodate said tilting of said stack.

References Cited in the file of this patent

UNITED STATES PATENTS

| | | |
|---|---|---|
| 706,651 | Goerz | Aug. 12, 1902 |
| 1,215,694 | Osborne | Feb. 13, 1917 |
| 2,617,218 | Antos | Nov. 11, 1952 |
| 2,812,056 | Jenkins | Nov. 5, 1957 |

FOREIGN PATENTS

| | | |
|---|---|---|
| 667,104 | France | June 3, 1929 |